US006437683B1

(12) United States Patent
Wolf et al.

(10) Patent No.: US 6,437,683 B1
(45) Date of Patent: Aug. 20, 2002

(54) KEYLESS SECURITY ENTRY CONTROL METHOD FOR MOTOR VEHICLES

(75) Inventors: Dirk Wolf, Dortmund; Peter Lunova, Iserlohn, both of (DE)

(73) Assignee: Leopold Kostal GmbH & Co. (DE)

( * ) Notice: Subject to any disclaimer, the term of this patent is extended or adjusted under 35 U.S.C. 154(b) by 0 days.

(21) Appl. No.: 09/475,811

(22) Filed: Dec. 30, 1999

(30) Foreign Application Priority Data

Jan. 8, 1999 (DE) .......................................... 199 00 415

(51) Int. Cl.$^7$ ................................................. G08B 5/22
(52) U.S. Cl. ................................ 340/5.61; 340/825.36; 340/426
(58) Field of Search ............................. 340/5.21, 5.61, 340/5.1, 5.2, 5.6, 5.64, 825.69, 825.72, 10.4, 10.41, 10.42, 825.36, 425.5, 426, 539, 574, 928

(56) References Cited

U.S. PATENT DOCUMENTS 5,596,313 A * 1/1997 Berglund, et al. .......... 340/574
5,648,767 A * 7/1997 O'Connor, et al. ......... 340/928

FOREIGN PATENT DOCUMENTS

| DE | 41 23 654 A1 | 1/1993 | |
|----|---|---|---|
| DE | 197 35 658 C1 | 7/1998 | |
| EP | 523602 B1 * | 7/1992 | ............ E05B/49/00 |

* cited by examiner

Primary Examiner—Van Trieu
(74) Attorney, Agent, or Firm—Brooks & Kushman, P.C.

(57) ABSTRACT

A keyless security entry control method and system for motor vehicles includes transmitting respective coded signals from at least two transmitters. The transmitted coded signals overlap within the motor vehicle and are separated outside of the motor vehicle. The coded signals are then received from the at least two transmitters with an identification (ID) transmitter. The position of the ID transmitter with respect to the motor vehicle is then determined from the received coded signals. The position of the ID transmitter is determined to be inside of the motor vehicle if the ID transmitter receives at least two coded signals and is determined to be outside of the motor vehicle if the ID transmitter receives only one coded signal. An action signal indicative of an action to be performed is transmitted from a transceiver device. In response to the ID transmitter receiving the action signal it is determined whether the position of the ID transmitter enables the ID transmitter to perform the action. If the position of the ID transmitter enables the ID transmitter to perform the action then a response signal is transmitted from the ID transmitter. The transceiver device then performs the action in response to receiving the response signal. The ID transmitter may then transmit a position signal indicative of the position of the ID transmitter. In response to receiving the position signal the transceiver device performs the action as a function of the position of the ID transmitter. The ID transmitter may be switched to a non operative mode if the position of the ID transmitter disables the ID transmitter from performing the action.

20 Claims, 2 Drawing Sheets

KEYLESS SECURITY ENTRY CONTROL METHOD FOR MOTOR VEHICLES

TECHNICAL FIELD

The present invention generally relates to keyless security entry control methods for motor vehicles. In particular, the present invention relates to a keyless security entry control method between a transceiver device disposed in a motor vehicle and an identification transmitter (ID-transmitter) in which determining the position of the ID-transmitter with respect to the motor vehicle coded signals indicative of specific motor vehicle regions and action signals are transmitted by the transceiver device and received by the ID-transmitter.

BACKGROUND ART

DE 41 23 654 A1 discloses a keyless security entry method for determining if an ID transmitter is located in the passenger compartment of the motor vehicle. The vehicle is locked if it is determined that no ID transmitters are located inside the passenger compartment. The position of the ID transmitter is determined for discovering whether the ID transmitter is located inside or outside of the vehicle. Two antennas functioning independently from each other are used to perform the disclosed method. One of the antennas is directed at the internal compartment of the vehicle and the other antenna is directed at the outside area of the vehicle (driver door region, passenger door region).

If after getting out of the vehicle an operator carrying an ID transmitter wishes to lock the vehicle by actuating the external door handle a question-response dialogue is initiated between a transceiver device within the vehicle and the ID transmitter. The ID transmitter can only transmit a response signal back to the transceiver device if the ID transmitter is located outside the vehicle in the reception range of the antenna directed at the outside area.

A plurality of ID transmitters is normally used with this type of keyless security entry control method. Therefore, the situation can arise that one ID transmitter remains in the vehicle and another ID transmitter is outside the vehicle and is used to lock the vehicle. Even if it is possible to unlock the vehicle by using one authorized ID transmitter the vehicle can be started up without authorization by using the ID transmitter remaining in the vehicle. For example, if anyone breaks into the vehicle.

This problem which arises from the method disclosed in DE 41 23 654 A1 is counteracted by the method disclosed in DE 197 35 658 C1. DE 197 35 658 C1 discloses a method in which upon detecting the operator's desire to lock the vehicle a test signal is transmitted from the transceiver device within the vehicle to ascertain whether ID transmitters are located in the passenger compartment after the vehicle has been locked. ID transmitters located in the passenger compartment respond to this test signal. A storage device allocated to the transceiver device registers these ID transmitters and disables them on the vehicle system side as being unauthorized. This feature ensures that the ID transmitters remaining in the passenger compartment prevent the vehicle from being unlocked and prevent an associated deactivation of an electronic immobilizer if an unauthorized user gains access to this ID transmitter, e.g. by breaking into the vehicle. Only after the vehicle has been unlocked once again using an authorized ID transmitter is the registration deleted of the particular ID transmitter which had been in the passenger compartment if this ID transmitter is still located in the passenger compartment when the authorized unlocking procedure takes place.

However, even if this method prevents the direct use by unauthorized persons of the ID transmitter located in the vehicle, it is possible should anyone steal this type of ID transmitter for them to use suitable means to read the coding thereof. The obtained information can ultimately be used to simulate an authorized ID transmitter to enable theft of the vehicle.

SUMMARY OF THE INVENTION

Therefore, it is an object of the present invention to provide a generic keyless security entry control method in which operational security is improved with respect to the methods of the prior art. This object is achieved by the ID transmitter itself determining its position by evaluating signals received from a transceiver device in the motor vehicle.

In accordance with the above object and other objects, the present invention provides a keyless security entry control method and system for motor vehicles. The method includes transmitting respective coded signals from at least two transmitters. The transmitted coded signals overlap within the motor vehicle and are separated outside of the motor vehicle. The coded signals are then received from the at least two transmitters with an identification (ID) transmitter. The position of the ID transmitter with respect to the motor vehicle is then determined from the received coded signals. The position of the ID transmitter is determined to be inside of the motor vehicle if the ID transmitter receives at least two coded signals and is determined to be outside of the motor vehicle if the ID transmitter receives only one coded signal.

Preferably, the method further includes transmitting a coded signal towards the area outside of a driver side of the motor vehicle from a first transmitter and transmitting a coded signal towards the area outside of an opposite passenger side of the motor vehicle from a second transmitter. The position of the ID transmitter is determined to be outside the motor vehicle and adjacent the driver side if the ID transmitter receives only the coded signal from the first transmitter. The position of the ID transmitter is determined to be inside the motor vehicle and adjacent the passenger if the ID passenger receives only the coded signal from the second transmitter.

The method may further include transmitting an action signal from a transceiver device. The action signal being indicative of an action to be performed. In response to the ID transmitter receiving the action signal it is determined whether the position of the ID transmitter enables the ID transmitter to perform the action. If the position of the ID transmitter enables the ID transmitter to perform the action then a response signal is transmitted from the ID transmitter. The transceiver device then performs the action in response to receiving the response signal. The ID transmitter may then transmit a position signal indicative of the position of the ID transmitter. In response to receiving the position signal the transceiver device performs the action as a function of the position of the ID transmitter. The ID transmitter may be switched to a non operative mode if the position of the ID transmitter disables the ID transmitter from performing the action.

In the case of the keyless security entry control method and system of the present invention, the ID transmitter itself determines its position and evaluates further the received signals. Therefore, in contrast to the ID transmitters of the prior art, the ID transmitter of the present invention is not merely passive with respect to the determination of its position (=transponder) but can also be described as being intelligent by actively evaluating the position-coded signals. The ID transmitter evaluates the received coded signals in a first step to establish whether the ID transmitter is located inside or outside of the vehicle. As provided in one embodiment, it is possible to perform a higher resolution position determination process wherein not only is the determination process performed to establish whether the ID transmitter is located inside or outside of the vehicle but a position determination process relating to the sides of the vehicle is also performed for establishing, for example, whether the ID transmitter is located on the driver or passenger side of the vehicle.

Following on from this type of position determination process, a plausibility check with respect to the received action signal is performed, in a first step of a further evaluation of the received action signal, in dependence upon the previously determined position of the ID transmitter. This plausibility check establishes whether the ID transmitter receiving the action signal is associated with regard to its position in a plausible manner with the action which is to be triggered. If an ID transmitter is located, for example, outside the vehicle and if by actuating the external door handle the ID transmitter has communicated to the system its wish to perform the locking action, then the ID transmitter receives upon being prompted a corresponding action signal which will lock the vehicle. The ID transmitter located outside the vehicle, e.g. in the region of the driver's door, has identified its own position by the position determination process and will conclude the plausibility check with a positive result because its ascertained position is objectively associated with the locking signal.

In contrast, if the ID transmitter or another ID transmitter is located in the internal compartment of the vehicle and receives this type of locking signal, then the plausibility check concludes with a negative result because this ID transmitter is not responsible for this type of question. A locking action will only be permitted if an authorized ID transmitter is located outside the vehicle. Following on from the plausibility check one or several actions is/are performed by the ID transmitter. In the former case, in which the ID transmitter is located outside the vehicle, the ID transmitter transmits a response signal to the transceiver device within the vehicle for locking the vehicle. In the latter case, wherein the plausibility check concludes with a negative result, the ID transmitter is immediately switched to its non-operative mode and does not take part in any further communication.

To avoid misuse of an ID transmitter located in the vehicle it is provided that during a triggered alarm an action signal is transmitted by the transceiver device within the vehicle using a prior prompting signal, whereupon the ID transmitters located in the internal compartment of the vehicle self-disable and therefore are not suitable for further use. ID transmitters which in such a case are located outside the vehicle would conclude the plausibility check with a negative result in such a case and would thus not be disabled. An ID transmitter which is disabled in this manner is also of no value to an unauthorized user within the scope of a simulation device used as a manipulator of the transceiver device. Attempts using this type of manipulator for stimulating the ID transmitter to transmit response signals fail because it is not possible to transmit response signals due to the self-disable facility in the ID transmitter. Therefore, it is not possible to use the ID transmitter for discovering a suitable simulation using a manipulator of this type.

The fact that all ID transmitters located in the transmission range of the transceiver device are prompted for a short period of time and that the ID transmitters which have concluded the plausibility check with a positive result are limited to a question-response dialogue to be performed signifies for the particular ID transmitters, which do not take part or do not need to take part in this dialogue, that they can be switched once again to their non-operative mode immediately after completing the plausibility check without corresponding current consumption.

In one embodiment of the method, it can be provided that the position determination ascertained by the ID transmitter is contained in a response telegram transmitted to the transceiver device so that the ID transmitter positions are known on the vehicle system side.

These and other features, aspects, and embodiments of the present invention will become better understood with regard to the following description, appended claims, and accompanying drawings.

BEST MODES FOR CARRYING OUT THE INVENTION

Figure 1:
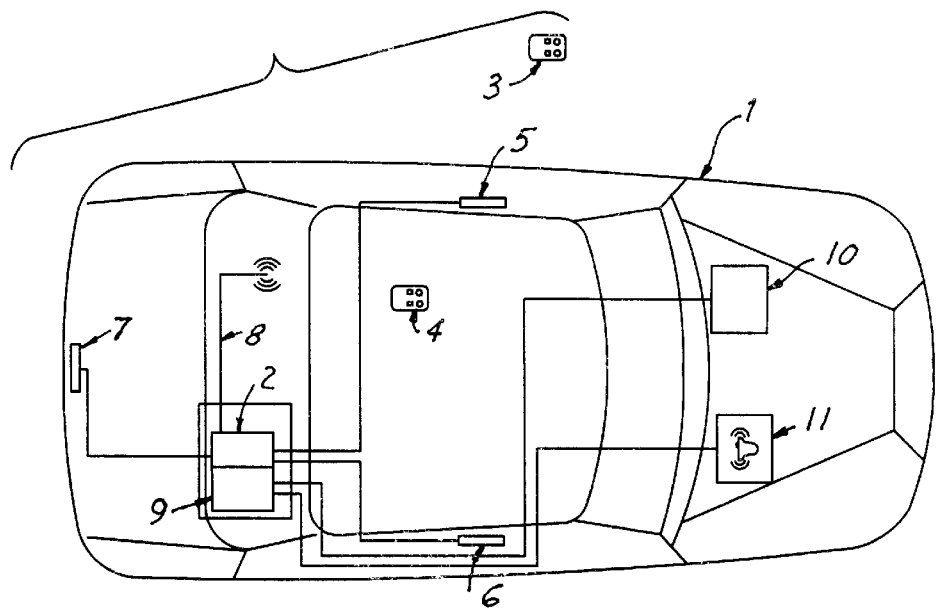
FIG. 1 illustrates a schematic of a motor vehicle having a keyless security entry control device in accordance with the present invention.

FIG. 1 illustrates a motor vehicle 1 including a keyless security entry control device. The keyless security entry device includes a transceiver device 2 disposed within the vehicle and a plurality of identification (ID) transmitters 3, 4. Transceiver device 2 has three transmitters 5, 6, 7, which function in a low frequency (LF) range for transmitting prompting and position-recognition signals. Transceiver device 2 is allocated a high frequency (HF) module associated with a transceiver antenna 8. Furthermore, transceiver device 2 is connected to an evaluating and control device 9. A central locking system 10 and an alarm module 11 are connected to evaluating and control device 9.

LF transmitters 5, 6, 7 are allocated to different sides of vehicle 1. LF transmitter 5 is allocated to the driver side, LF transmitter 6 is allocated to the passenger side, and LF transmitter 7 is allocated to the rear region. The transmission ranges of LF transmitters 5, 6, 7 do not overlap outside vehicle 1. However, they do overlap in the internal compartment of vehicle 1.

Figure 2:
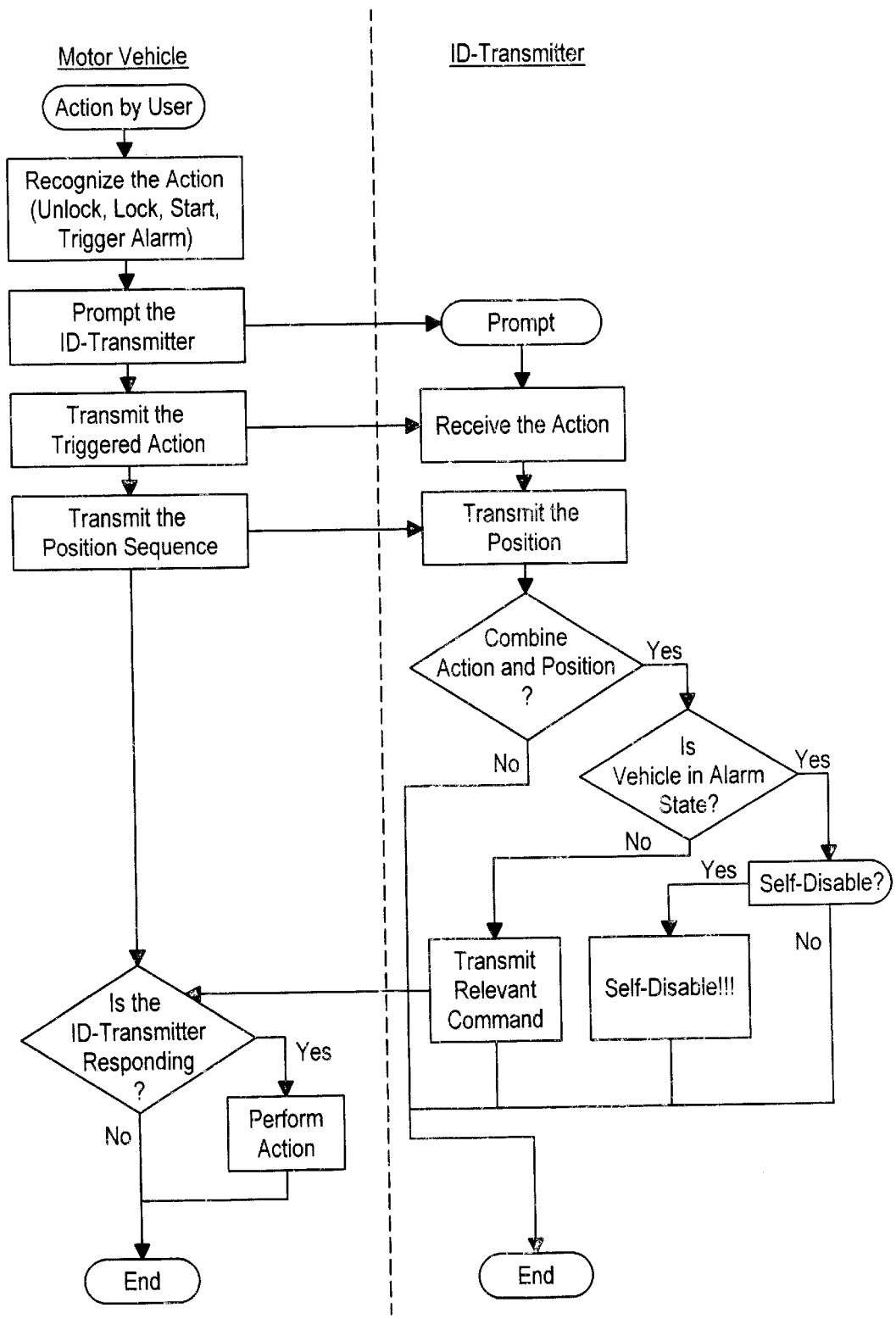
FIG. 2 illustrates a flow diagram describing operation of the sequence of a keyless security entry control method in accordance with the present invention.

The operation of the keyless security entry control device illustrated in FIG. 1 is explained hereinunder by means of a method sequence provided by way of example with reference to the flow diagram in FIG. 2. A situation is assumed in which ID transmitter 3 is located outside the locked vehicle 1 and ID transmitter 4 is located inside the locked vehicle. To open vehicle 1 the person carrying ID transmitter 3 actuates, for example, the door handle on the driver's door. In response, an electrical switch transmits to transceiver device 2 the person's desire to unlock the door.

Transceiver device 2 then commences a question-response-dialogue. In a first step, LF transmitters 5, 6, 7 transmit prompting signals for prompting ID transmitters located in the reception region of these LF transmitters 5, 6, 7. In the case of the exemplified embodiment illustrated in FIG. 1, ID transmitters 3, 4 are located in the transmission range of LF transmitters 5, 6, 7.

Subsequently, position-coded LF signals are transmitted by LF transmitters 5, 6, 7. In so doing, the position-coding can be formed in various ways, for example, by allocating a different code to the different LF transmitters 5, 6, 7 or by a time-slot coding with a comparison to a synchronisation created by the prompting procedure between transceiver device 2 and ID transmitters 3, 4. An action signal is then transmitted on the HF path containing information regarding the action which is to be performed. It is necessary to establish that when the action signal is being transmitted by transceiver device 2 the action is not yet actually being performed. The action signal thus corresponds to the question signal of the question-response dialogue.

The process of determining the position of ID transmitters (ID transmitters 3, 4 in the exemplified embodiment illustrated in FIG. 1) which are located in the reception range of LF transmitters 5, 6, 7 will now be described. The process of determining the position of ID transmitters 3, 4 is performed by the ID transmitters themselves without the ascertained position being transmitted back to transceiver device 2. The position is determined by evaluating a predetermined number of received position signals, wherein upon reception of merely one coding, such as for example from ID transmitter 3, a coding corresponding to the driver's door enables the conclusion to be drawn that this ID transmitter 3 is located outside vehicle 1 in the region of the driver's door. In contrast to ID transmitter 3, ID transmitter 4 located inside vehicle 1 receives position-coded signals by the overlapping transmission ranges of LF transmitters 5, 6, 7 from LF transmitter 5 and from LF transmitter 6. The reception of two different position-coded signals enables the conclusion to be drawn that ID transmitter 4 is located inside vehicle 1.

In a subsequent step, ID transmitters 3, 4 perform a plausibility check in which it is established whether the transmitted action and/or question signal are associated in a plausible manner with respect to the previously ascertained position of ID transmitters 3, 4. Upon reception of the question signal "Unlock ?" by ID transmitter 3, the plausibility check implemented is concluded with a positive result because this ID transmitter is located outside vehicle 1 and therefore it seems plausible to unlock the vehicle. ID transmitter 4 located in vehicle 1 concludes the plausibility check with a negative result because it is not plausible for this ID transmitter to unlock vehicle 1 because this ID transmitter 4 is already located in the internal compartment of vehicle 1.

The action which follows on from this plausibility check is triggered in a correspondingly different manner: ID transmitter 3 transmits a response signal on the HF path to transceiver device 2 with the information to perform the required unlocking procedure. Evaluating and control device 9 then controls central locking system 10 for unlocking vehicle 1. The action performed by ID transmitter 4 after the implemented plausibility check relates to a process of switching the ID transmitter 4 to its non-operative mode. As a consequence, ID transmitter 4 does not take part in any further communication such as is performed between transceiver device 2 and ID transmitter 3. In a further embodiment, it can be provided that the response signal of ID transmitter 3 transmits a position determination to transceiver device 2 so that it is possible to unlock only the driver's door.

Figure 3:
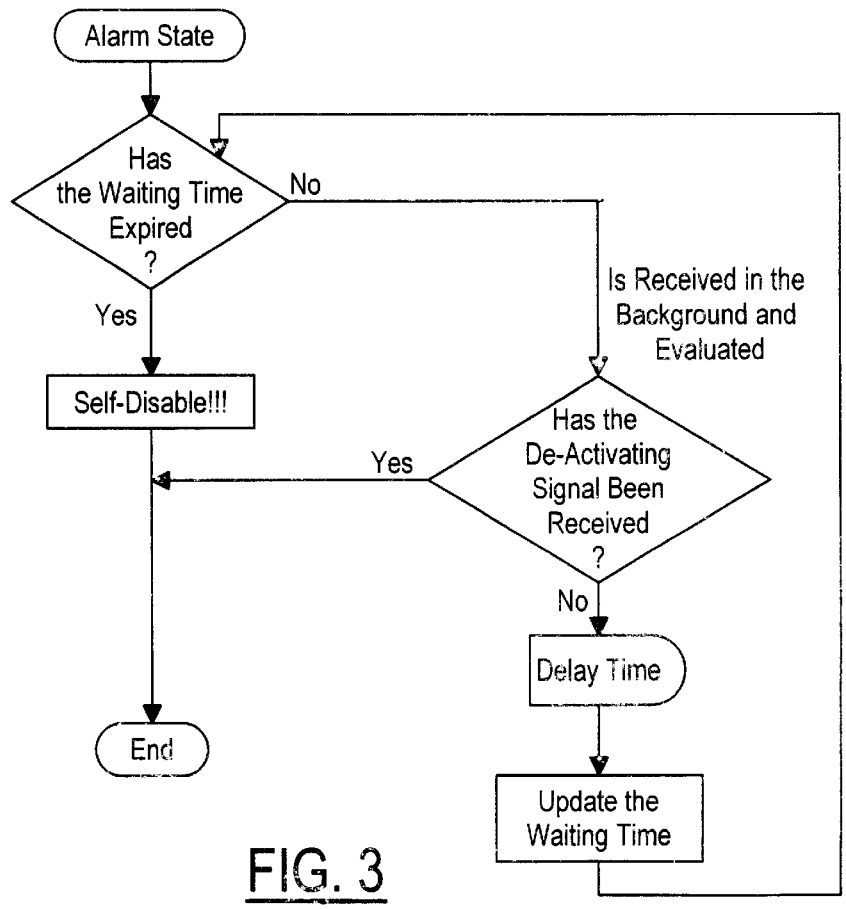
FIG. 3 illustrates a flow diagram describing the ecision structure according to which the ID transmitter self-disables.

If, in a different situation, only ID transmitter 4 is located inside vehicle 1 and there is no other ID transmitter in the transmission range outside the vehicle and if an unauthorized user attempts to break into the vehicle, wherein alarm module 11 serves to trigger an alarm, substantially the same process steps are performed as previously explained in FIG. 2. The action signal which ID transmitter 4 receives is an alarm signal. In such a case, the plausibility check is terminated with a positive result by ID transmitter 4 because in the event of a break-in any unauthorized use of the ID transmitter is to be prevented. Following on from this plausibility check, ID transmitter 4 self-disables so that essentially it can no longer be used. As illustrated in the flow diagram in FIG. 3, it is possible to couple the self-disabling procedure in dependence upon a deactivating signal which follows shortly after the alarm signal, wherein the self-disabling procedure is only performed if after a predetermined delay time no deactivating signal has been received by ID transmitter 4.

It is evident in the description of the present invention that the operating security and the diversity of usage over conventional methods are increased particularly by using the ID transmitters as decision carriers. Therefore, it is possible to describe these ID transmitters as "intelligent" ID transmitters.

Thus it is apparent that there has been provided, in accordance with the present invention, a keyless security entry control method and system for a motor vehicle that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A keyless security entry control system for a motor vehicle, the system comprising:

a transceiver device having at least two transmitters each for transmitting respective coded signals, wherein the at least two transmitters are operable such that transmitted coded signals overlap within the motor vehicle and are separated outside of the motor vehicle; and an identification (ID) transmitter for receiving the coded signals from the at least two transmitters, the ID transmitter further operable for determining its position with respect to the motor vehicle from the received coded signals, wherein the ID transmitter determines its position to be inside of the motor vehicle if it receives at least two coded signals and determines its position to be outside of the motor vehicle if it receives only one coded signal.

2. The system of claim 1 wherein:

a first transmitter is positioned at a driver side location within the motor vehicle and a second transmitter is positioned at an opposite passenger side location within the motor vehicle, wherein the first and the second transmitter transmit respective coded signals to areas adjacent the first and second transmitters, wherein the ID transmitter determines its position to be outside the motor vehicle and adjacent the driver side if it receives only the coded signal from the first transmitter and determines its position to be inside the motor vehicle and adjacent the passenger side if it receives only the coded signal from the second transmitter.

3. The system of claim 1 wherein:

each of the coded signals have different codes.

4. The system of claim 1 wherein:

each of the coded signals have different time slot codes.

5. The system of claim 1 wherein:

the transceiver device is operable for transmitting an action signal to the ID transmitter, the action signal is indicative of an action to be performed, wherein in response to the action signal the ID transmitter determines whether the position of the ID transmitter enables the ID transmitter to perform the action.

6. The system of claim 5 wherein:

the ID transmitter transmits a response signal to the transceiver device if the position of the ID transmitter enables the ID transmitter to perform the action, wherein in response to the response signal the transceiver device performs the action.

7. The system of claim 6 wherein:

the ID transmitter transmits a position signal to the transceiver device, the position signal indicative of the position of the ID transmitter, wherein in response to the position signal the transceiver device performs the action as a function of the position of the ID transmitter.

8. The system of claim 6 wherein:

the ID transmitter switches to a non operative mode if the position of the ID transmitter disables the ID transmitter from performing the action.

9. The system of claim 5 wherein:

the at least two transmitters and the ID transmitter communicate on a low frequency band, and the transceiver device and the ID transmitter communicate on a high frequency band.

10. The system of claim 5 wherein:

the action includes locking the doors of the motor vehicle.

11. The system of claim 5 wherein:

the action includes unlocking the doors of the motor vehicle.

12. The system of claim 1 wherein:

the transceiver device is operable for transmitting an alarm signal to the ID transmitter, wherein in response to the alarm signal the ID transmitter switches to a non operative mode.

13. A keyless security entry control method for motor vehicles, the method comprising:

transmitting respective coded signals from at least two transmitters, wherein transmitted coded signals overlap within the motor vehicle and are separated outside of the motor vehicle;

receiving the coded signals from the at least two transmitters with an identification (ID) transmitter; and determining the position of the ID transmitter with respect to the motor vehicle from the received coded signals, the position of the ID transmitter is determined to be inside of the motor vehicle if the ID transmitter receives at least two coded signals and is determined to be outside of the motor vehicle if the ID transmitter receives only one coded signal.

14. The method of claim 13 further comprising:

transmitting a coded signal towards the area outside of a driver side of the motor vehicle from a first transmitter and transmitting a coded signal towards the area outside of an opposite passenger side of the motor vehicle from a second transmitter;

determining the position of the ID transmitter to be outside the motor vehicle and adjacent the driver side if the ID transmitter receives only the coded signal from the first transmitter; and determining the position of the ID transmitter to be inside the motor vehicle and adjacent the passenger if the ID passenger receives only the coded signal from the second transmitter.

15. The method of claim 13 further comprising:

transmitting an action signal from a transceiver device, wherein the action signal is indicative of an action to be performed;

receiving the action signal with the ID transmitter; and determining whether the position of the ID transmitter enables the ID transmitter to perform the action.

16. The method of claim 15 further comprising:

transmitting a response signal from the ID transmitter if the position of the ID transmitter enables the ID transmitter to perform the action;

receiving the response signal with the transceiver device; and performing the action with the transceiver device in response to receiving the response signal.

17. The method of claim 16 further comprising:

transmitting a position signal from the ID transmitter, wherein the position signal is indicative of the position of the ID transmitter;

receiving the position signal with the transceiver device; and performing the action with the transceiver device in response to the position signal as a function of the position of the ID transmitter.

18. The method of claim 15 further comprising:

switching the ID transmitter to a non operative mode if the position of the ID transmitter disables the ID transmitter from performing the action.

19. The method of claim 15 wherein:

the action includes unlocking the doors of the motor vehicle.

20. The method of claim 13 further comprising:

transmitting an alarm signal from the transceiver device;

receiving the alarm signal with the ID transmitter; and switching the ID transmitter to a non operative mode in response to the alarm signal.

* * * * *

UNITED STATES PATENT AND TRADEMARK OFFICE
CERTIFICATE OF CORRECTION

PATENT NO. : 6,437,683 B1
DATED : August 20, 2002
INVENTOR(S) : Dirk Wolf

It is certified that error appears in the above-identified patent and that said Letters Patent is hereby corrected as shown below:

Column 7,
Line 20, delete "6" and insert -- 5 --.

Signed and Sealed this

Twelfth Day of November, 2002

Attest:

Attesting Officer

JAMES E. ROGAN
Director of the United States Patent and Trademark Office